No. 771,354. PATENTED OCT. 4, 1904.
J. DANCIGER.
ATTACHMENT FOR CORN OR SUGAR CANE HARVESTERS.
APPLICATION FILED MAR. 22, 1904.
NO MODEL.
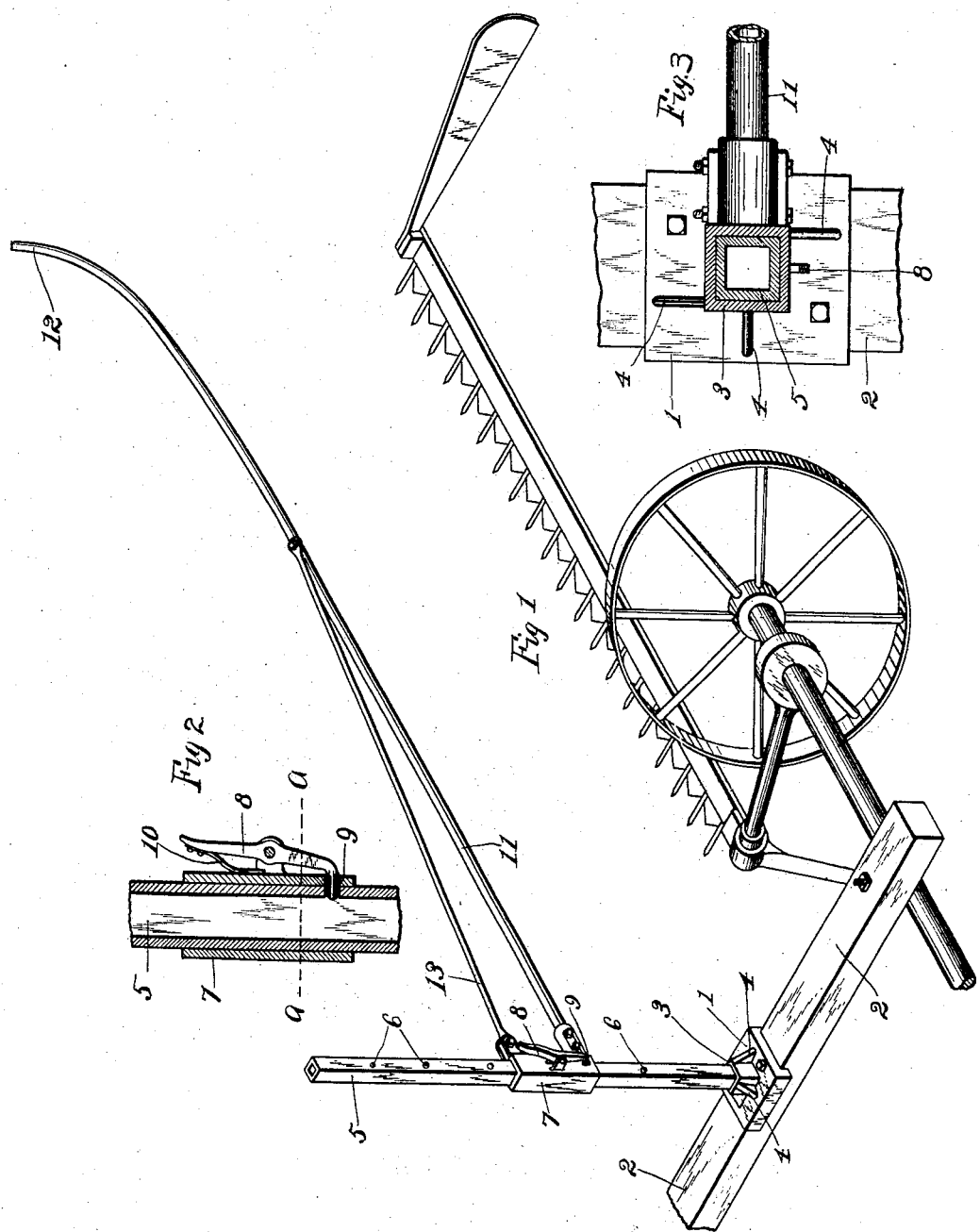
Witnesses:
W. A. Tingle.
R. E. Hamilton.
Inventor:
Joseph Danciger.
By Higdon & Higdon
Attys.

No. 771,354.  
Patented October 4, 1904.

UNITED STATES PATENT OFFICE.

JOSEPH DANCIGER, OF KANSAS CITY, MISSOURI.

ATTACHMENT FOR CORN OR SUGAR-CANE HARVESTERS.

SPECIFICATION forming part of Letters Patent No. 771,354, dated October 4, 1904.

Application filed March 22, 1904. Serial No. 199,341. (No model.)

*To all whom it may concern:*

Be it known that I, JOSEPH DANCIGER, a citizen of the United States, and a resident of Kansas City, in the county of Jackson and State of Missouri, have invented new and useful Improvements in Attachments for Corn or Sugar-Cane Harvesters, of which the following is a specification.

My invention relates to an attachment to be attached to harvesters for harvesting Kafir corn, sugar-cane, tall grass, &c.; and the object of my invention is to gather the stalks of the standing corn at the outer end of the sickle inward toward the swath of the machine as they are severed from the stumps by the sickle of the machine.

In harvesting Kafir corn or sugar-cane or tall grass without my attachment when the stalks are severed by the outer end of the sickle many of them will fall outward toward the standing corn and lodge within the standing corn, so that when the machine comes around cutting another swath this severed corn that has fallen out in the standing corn causes the corn to tangle and choke the machine. My invention obviates this difficulty, as the long extended arm gathers the stalks inward toward the swath as they are severed.

Figure 1 illustrates my invention mounted on the tongue or pole of a harvester. Fig. 2 is a vertical section of a sleeve that is adjustably attached to Fig. 1. Fig. 3 is an enlarged plan view taken on line *a a* of Fig. 2 looking downward toward the tongue of the harvester.

With the above description I will now proceed to more fully describe my invention by referring to corresponding numerals on the drawings and the specification, in which—

1 is a seat attached to the tongue 2 of the harvester. Said seat is provided with a socket 3. Said socket 3 is supported by ribs 4, as seen. Vertically and rigidly secured in said socket and to the seat is a standard 5. Said standard is rectangular in configuration and is hollow and is further provided with openings or perforations 6 in one side. Adjustably secured to said standard is a sleeve 7 of same configuration. To said sleeve is mounted a thumb spring-latch 8. The lower end of said latch is bent at right angles and is adapted to pass through an opening 9 in said sleeve and correspondingly engage the openings 6 in the standard 5. Secured to the upper end of said latch is a spring 10. Said spring is adapted to hold the latch in engagement in the openings 6 of the vertical standard. Rigidly secured to said sleeve 7 is a horizontal arm 11. Said horizontal arm extends outward or laterally from said standard a distance equal or slightly more than the length of the cutter-blade of the harvester, and the outer end 12 is slightly curved forward of the machine. The object of this arm is to gather the standing product inward toward the sickle-bar as the harvester is drawn forward. By this means all of the stalk severed will fall inward toward the swath, leaving the standing product clear and free from falling stalks to be cut on the next round of the harvester. Secured to said arm 11 and to the sleeve 7 is a brace 13. The object of said brace is to support the arm 11.

Having now fully described my invention, what I claim, and desire to secure by Letters Patent of the United States, is—

1. An attachment for corn or sugar-cane harvesters, of the character described, of a seat secured to the tongue of the harvester, a vertical standard mounted to the seat, a sleeve adjustably attached to the standard, a thumb-latch carried by the sleeve and adapted to engage openings in the sleeve and corresponding openings in the standard, an outward extending arm carried by the sleeve and the standard, substantially as described.

2. An attachment for corn or sugar-cane harvesters, of the character described, of a seat, a standard mounted to the seat, an adjustable sleeve carried by the standard, a thumb-latch mounted to the sleeve and adapted to engage openings in the sleeve and in the standard, a laterally-extending arm secured to the sleeve, a supporting-brace mounted to the sleeve and the arm, substantially as described.

In testimony whereof I affix my signature in the presence of two witnesses.

JOSEPH DANCIGER.

Witnesses:
JOSEPHINE W. GARRISON,
K. M. IMBODEN.